(12) United States Patent
Farasat et al.

(10) Patent No.: US 9,515,951 B2
(45) Date of Patent: Dec. 6, 2016

(54) COMPUTING SYSTEM ARCHITECTURE THAT FACILITATES FORMING OF CUSTOMIZED VIRTUAL DISKS

(71) Applicant: Microsoft Corporation, Redmond, WA (US)

(72) Inventors: Ali Raza Farasat, Sammamish, WA (US); James Williamson Mickens, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 14/081,387

(22) Filed: Nov. 15, 2013

(65) Prior Publication Data
US 2015/0142976 A1    May 21, 2015

(51) Int. Cl.
| | |
|---|---|
| G06F 15/167 | (2006.01) |
| G06F 15/173 | (2006.01) |
| G06F 21/00 | (2013.01) |
| G06F 13/28 | (2006.01) |
| G06F 9/26 | (2006.01) |
| H04L 12/911 | (2013.01) |
| G06F 3/06 | (2006.01) |
| G06F 9/50 | (2006.01) |

(52) U.S. Cl.
CPC .............. *H04L 47/70* (2013.01); *G06F 3/0605* (2013.01); *G06F 3/0631* (2013.01); *G06F 3/0662* (2013.01); *G06F 3/0683* (2013.01); *G06F 9/5077* (2013.01)

(58) Field of Classification Search
CPC ............... H04L 67/104; H04L 67/1002; H04L 67/1068; H04L 67/1097; H04L 41/22; H04L 41/50; H04L 41/0803; H04L 47/70
USPC .... 709/216, 223, 224, 226; 711/4, 114, 163, 711/170, 202, 203
See application file for complete search history.

(56) References Cited

U.S. PATENT DOCUMENTS

| | | |
|---|---|---|
| 6,493,811 B1 | 12/2002 | Blades et al. |
| 6,792,519 B2 | 9/2004 | Constable et al. |

(Continued)

OTHER PUBLICATIONS

Hamilton, James, "Perspectives—High Performance Computing hits the Cloud", Published on: Jul. 13, 2010, Retrieved at: <<http://perspectives.mvdirona.com/2010/07/13/HighPerformanceComputingHitsTheCloud.aspx>>, pp. 1-4.

(Continued)

*Primary Examiner* — Farzana Huq
(74) *Attorney, Agent, or Firm* — Alin Corie; Sandy Swain; Micky Minhas (57) ABSTRACT

A computing system architecture that facilitates constructing a virtual disk that is customized for an application is described herein. An exemplary computing system having such architecture includes a first plurality of homogeneous storage servers, each storage server in the first plurality of storage servers comprising respective data storage devices of a first type. The exemplary computing system also includes a second plurality of homogeneous storage servers, each storage server in the second plurality of storage servers comprising respective data storage devices of a second type. A virtual disk that is customized for an application is constructed by mapping a linear (virtual) address space to portions of storage devices across the first plurality of storage servers and the second plurality of storage servers. The storage servers are accessible over a full bisection bandwidth network.

20 Claims, 6 Drawing Sheets

(56) References Cited

U.S. PATENT DOCUMENTS

| | | | |
|---|---|---|---|
| 7,440,998 B2* | 10/2008 | Hiray | G06F 9/4405 709/203 |
| 8,997,097 B1* | 3/2015 | Aron | G06F 9/45533 709/223 |
| 2002/0112113 A1 | 8/2002 | Karpoff et al. | |
| 2006/0161753 A1 | 7/2006 | Aschoff et al. | |
| 2012/0042061 A1 | 2/2012 | Ayala et al. | |
| 2012/0079229 A1 | 3/2012 | Jensen et al. | |
| 2012/0089781 A1 | 4/2012 | Ranade et al. | |
| 2013/0054808 A1* | 2/2013 | Hildebrand | G06F 9/505 709/226 |
| 2013/0054932 A1 | 2/2013 | Acharya et al. | |
| 2013/0080699 A1 | 3/2013 | Shigeta | |
| 2013/0081014 A1 | 3/2013 | Kadatch et al. | |
| 2013/0111032 A1 | 5/2013 | Alapati et al. | |
| 2013/0151701 A1* | 6/2013 | Jain | G06F 9/5094 709/224 |
| 2013/0262801 A1* | 10/2013 | Sancheti | G06F 3/065 711/162 |
| 2013/0290451 A1 | 10/2013 | Harik et al. | |
| 2014/0149696 A1* | 5/2014 | Frenkel | G06F 9/45558 711/162 |

OTHER PUBLICATIONS

Singla, et al., "Jellyfish: Networking Data Centers Randomly", In Proceedings of the 9th USENIX Conference on Networked Systems Design and Implementation, Apr. 25, 2012, pp. 1-6.

"International Search Report (ISR) and Written Opinion for PCT Patent Application No. PCT/US2014/065349", Mailed Date: Mar. 18, 2015, 15 Pages.

* cited by examiner

COMPUTING SYSTEM ARCHITECTURE THAT FACILITATES FORMING OF CUSTOMIZED VIRTUAL DISKS

BACKGROUND

Cloud operators use data centers to provide computing services to clients of the cloud operators. This arrangement is mutually beneficial for the cloud operator and the client. For example, the client can enter into a contract with the cloud operator, whereby a computer-executable application of the client is to execute on computing devices at the computing system of the cloud operator. If the computing system is a data center, the client pays a recurring fee for computing resources that are allocated to the application of the client. It can, therefore, be ascertained that the cloud operator receives a continuing revenue stream from the client, while the client avoids paying a relatively high initial cost for purchasing computing equipment to execute the computer executable application; the client also transfers administrative responsibilities for the computing equipment to the cloud operator. Further, due to economy of scale purchasing power, the cloud operator can purchase computing equipment from a manufacturer at lower costs compared to the costs that would be charged to the client by the manufacturer.

Conventionally, data centers are configured to service a multitude of clients that have various different computer-executable applications that execute on computing devices of the data center, where such applications have heterogeneous workloads. Accordingly, different computer-executable applications, to execute optimally, may have different respective hardware configurations associated therewith. Conventional data centers are not well equipped to effectively handle applications with heterogeneous workloads. For example, a conventional cloud operator allows a client to coarsely describe an application that is to be executed at the data center, and then executes the application using hardware that corresponds to the coarse description. Exemplary coarse descriptions include "high storage capacity" and "low storage latency." For example, when the client indicates that a computer-executable application thereof is best classified as a "high storage capacity" application, such application can be allocated a server(s) in the data center that has a relatively large amount of computer-readable storage in the form of hard disk drive (HDD), wherein reads and writes to the HDD are relatively slow compared to other types of computer-readable storage. In another example, when the client indicates that the computer-executable application is best classified as a "low storage latency" application (e.g., a database application that must perform many low-latency transactions with storage), the application can be allocated a server(s) in the data center that includes computer-readable storage in the form of a solid state drive (SSD), wherein cost of storing each byte in the SSD is higher compared to cost of storing each byte in a HDD, but reads and writes to the SDD are faster compared to reads and writes to a HDD.

It can be ascertained, however, that many applications are not readily classifiable as belonging to one of the coarse descriptions noted above. Cloud operators have conventionally used two different approaches to handle such applications. The first approach is to require that the client accept one of the coarse descriptions, and consequently the application is executed using computing hardware that is sub-optimal for the application. The second approach is to acquire a customized server for the client (e.g., particularly when the client is a relatively large client and will be providing a significant amount of revenue). In the second approach, however, the cloud operator may lose some of the benefits associated with purchasing power based upon economies of scale, as the cloud operator may be requesting that a manufacturer generate a relatively small number of customized computing devices.

SUMMARY

The following is a brief summary of subject matter that is described in greater detail herein. This summary is not intended to be limiting as to the scope of the claims.

Described herein are various technologies pertaining to a computing system architecture that facilitates providing different applications of different clients having heterogeneous workloads with respective customized computer-readable storage configurations, while preserving benefits associated with economies of scale purchasing. In an exemplary embodiment, the computing system can be a data center, where the clients are independent businesses. In another exemplary embodiment, the computing system can be an enterprise server system, where the clients can be divisions of an enterprise. It is to be understood that the computing system can be any suitable computing system that has the architecture described herein. The exemplary computing system architecture described herein may provide clients with customized storage configurations while reducing costs to the cloud operator (and thus to the clients).

A computing system that has the exemplary architecture comprises a relatively small number of storage server stockkeeping units (SKUs), wherein a storage server SKU identifies storage servers having a particular hardware configuration. That is, a first storage server SKU identifies storage servers having a first hardware configuration, a second storage server SKU identifies storage servers having a second hardware configuration, etc. In an example, the computing system may include storage server devices identified by a relatively small number of storage server SKUs, such as on the order of between two and four storage server SKUs. As the cloud operator is able to purchase a relatively large number of storage servers identified by a single storage server SKU, the cost of each storage server may be reduced due to economies of scale purchasing power. Therefore, the computing system can include a first plurality of storage server devices identified by a first storage server SKU, a second plurality of storage server devices identified by a second storage server SKU, etc.

In an example, a storage server identified by the first storage server SKU may comprise a plurality of hard disk drives (HDDs), while a storage server identified by the second storage server SKU may comprise a plurality of solid state drives (SSDs). It can be ascertained that the cost per byte of storing data in a HDD is smaller compared to a cost per byte of storing data in a SSD, although data can be written to and read from the SSD faster than data can be written to and read from the HDD.

The data center may also include a plurality of computing nodes that can access storage servers identified by the first SKU and storage servers identified by the second SKU. In an exemplary embodiment, the computing nodes can be communicatively coupled with the storage servers by way of a full bisection bandwidth network. Each storage server can be provided with respective network bandwidth that is at least as high as an aggregate of input/output (I/O) speeds of storage devices in the storage server. For example, when a storage server comprises ten HDDs, and each HDD has an I/O speed of 1 GB per second, the storage server can be allocated network bandwidth of 10 GB per second. Therefore, a computing node can read data from and write data to a disaggregated storage device in a storage server at the full I/O speed of the storage device. Similarly, when a storage server identified the second SKU includes 10 SSDs, and each SSD has an I/O speed of 4 GB per second, the storage server can be allocated 40 GB per second of network bandwidth, such that a computing node can write to and read from the SSDs in the storage server at full I/O speed of the SSDs.

Given the above-described architecture, a customized virtual storage disk can be constructed for an arbitrary application of an arbitrary client. The virtual storage disk is backed by arbitrary storage devices in storage servers identified by potentially different SKUs. That is, for example, a computer-executable application can specify that 60% of reads and writes are desirably undertaken on a HDD, while 40% of reads and writes are desirably undertaken on a SSD. Responsive to receiving such information, a virtual storage disk can be constructed that is backed by computer-readable storage of appropriate type(s); e.g., for the example noted above, the virtual storage disk can be backed partially by at least one HDD from a storage server identified by a first storage server SKU and partially by at least one SSD from a storage server identified by a second storage server SKU.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a virtual storage disk are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
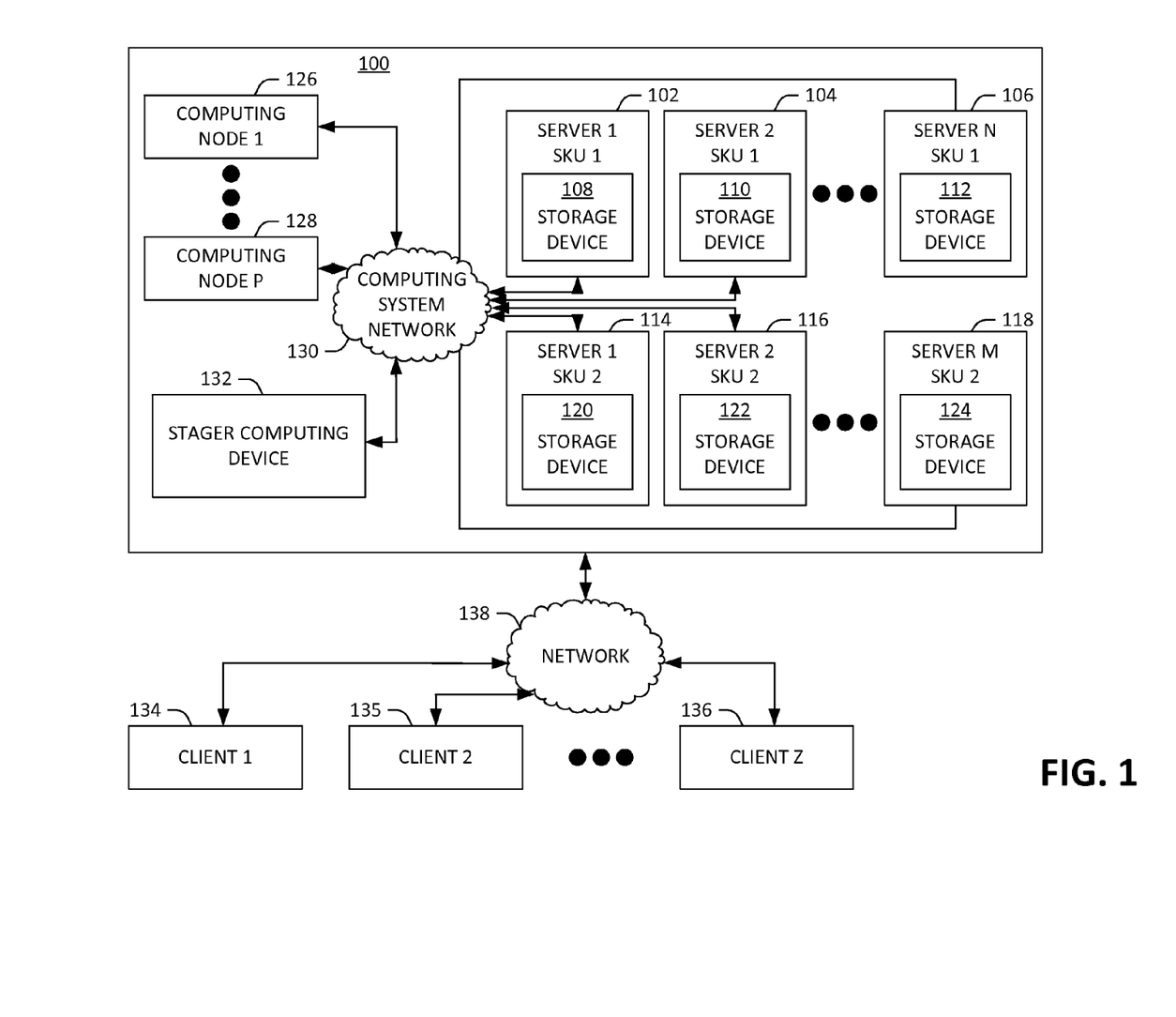
FIG. 1 is a block diagram of an exemplary computing system.

With reference now to FIG. 1, an exemplary computing system 100 is illustrated. The computing system 100 can be a data center that services multiple clients, where the clients are separate businesses and/or people. In another example, the computing system 100 can be an enterprise server system that services multiple clients, where the clients are divisions in an enterprise. As will be described in greater detail herein, the computing system 100 comprises numerous storage servers that can respectively be identified by a relatively small number of storage server stock-keeping units (SKUs), wherein the storage server SKUs can provide relatively high performance storage input/output to heterogeneous workloads.

The computing system 100 is described as including storage servers that can be identified by two SKUs; it is to be understood, however, that the computing system 100 may include storage servers that can be identified by more than two storage server SKUs (while such number remains relatively small, such as on the order of between two and 10 storage server SKUs). Application-specific I/O performance is provided to an arbitrary application, in accordance with its custom needs, through construction of a virtual disk that is backed by storage devices across storage servers identified by different SKUs.

The computing system 100 includes a first plurality of homogeneous storage servers 102-106, wherein the first plurality of storage servers 102-106 are identified by a first storage server SKU. Each storage server in the first plurality of storage servers 102-106 includes at least one respective storage device. That is, the plurality of storage servers 102-106 comprise a respective plurality of storage devices 108-112. As the plurality of storage servers 102-106 are homogeneous, the plurality of storage devices 108-112 are likewise homogeneous. For example, the plurality of storage devices 108-112 may be hard disk drives (HDDs). While each storage server in the first plurality of storage servers 102-106 is shown as including a single respective storage device, it is to be understood that each storage server in the first plurality of storage servers 102-106 may include multiple respective storage devices.

The computing system 100 further comprises a second plurality of homogeneous storage servers 114-118, wherein the second plurality of storage servers 114-118 is identified by a second storage server SKU. Each storage server in the second plurality of storage servers 114-118 comprises at least one respective storage device. Thus, the second plurality of storage servers 114-118 respectively comprise storage devices 120-124. As the second plurality of storage servers 114-118 are homogeneous, the storage devices 120-124 are likewise homogeneous. In an example, the storage devices 120-124 can be solid state drives (SSDs). It can therefore be ascertained that the storage devices 108-112 of the first plurality of storage servers 102-106 have different operating characteristics when compared to operating characteristics of the storage devices 120-124 in the second plurality of storage servers 114-118. For example, input/output (I/O) speeds of the storage devices 120-124 may be higher than I/O speeds of the storage devices 108-112. In another example, storage capacity of the storage devices 108-112 may be greater than storage capacity of the storage devices 120-124. Further, cost per byte of storage in the storage devices 120-124 may be higher than cost per byte of storage in the storage devices 108-112.

The computing system 100 further comprises a plurality of computing nodes 126-128 that can access the first plurality of storage servers 102-106 and the second plurality of storage servers 114-118 by way of a computing system network 130. In an exemplary embodiment, the computing system network 130 can be a full bisection bandwidth network. Additionally, each storage server in the first plurality of storage servers 102-106 and the second plurality of storage servers 114-118 can be allocated network bandwidth that matches or exceeds aggregate I/O speeds of respective storage devices in a respective storage server. For instance, the storage server 102 may include 10 HDDs, wherein each HDD in the storage server 102 can have a respective I/O speed associated therewith of 1 GB per second. Accordingly, the storage server 102 may be allocated at least 10 GB per second of network bandwidth. Therefore, regardless of how the computing system network 130 is partitioned, any of the computing nodes in the plurality of computing nodes 126-128 can write data to and read data from any of the storage devices 108-112 in the first plurality of storage servers 102-106 and any of the storage devices 120-124 in the second plurality of storage servers 114-118 at full speed.

The computing system 100 may further include a stager computing device 132 that is configured to allocate computing resources to an application that is to execute using the computing resources of the computing system 100. In an exemplary embodiment, the computing nodes 126-128 may be conventional server computing devices having respective CPUs and local storage. In another exemplary embodiment, the computing nodes 126-128 may be or comprise a motherboard that includes a central processing unit (CPU), a graphics processing unit (GPU), a network interface controller (NIC), etc. In yet another exemplary embodiment, the computing nodes 126-128 may be system on chip (SoC) modules, wherein each SoC module includes a respective microprocessor core, a respective memory, and a NIC, and further wherein the microprocessor core, the memory, and the NIC are formed on a same (common) semiconductor substrate.

As will be described in greater detail herein, the stager computing device 132 can receive specifications of an arbitrary application that is to be executed using the computing resources of the computing system 100. Responsive to receiving such specifications, a virtual disk can be constructed, wherein the virtual disk is backed by appropriate amounts of storage of appropriate type(s) from amongst the first plurality of storage servers 102-106 and the second plurality of storage servers and 114-118 (and storage of other SKUs if applicable).

Operation of the exemplary computing system 100 is now described. The computing system 100 is configured to perform computing operations for a plurality of clients 134-136 that can access the computing system 100 by way of a suitable network 138 (e.g., the Internet). Each client may have a respective application associated therewith, wherein applications of the clients 134-136 have heterogeneous workloads. For example, a first application of the first client 134 may be a database application that operates most efficiently when reading data from and writing data to storage devices with low I/O latency (e.g., SSDs). The second application of the second client 135 may be a video streaming application that issues relatively long sequential reads of large data objects, and thus operates most efficiently when reading data from and writing data to storage devices with lower I/O speeds but lower cost per byte of storage (e.g., HDDs). A Zth application of the Zth client 136 can be a file system application that updates metadata relatively often and other data less often, and therefore operates most efficiently when writing the metadata to and reading the metadata from SSDs while writing the other data to and reading the other data from HDDs.

The stager computing device 132 is configured to construct a respective customized virtual disk for each application, wherein the respective virtual disk is backed by appropriate type(s) of storage (e.g., HDD and/or SSD) and amounts of storage based upon operations of the application. Continuing with the example set forth above, the stager computing device 132, for the first application of the first client 134, can construct a customized virtual disk that is backed primarily by storage devices in the second plurality of storage servers 114-118 (e.g., SSDs). Similarly, for the second application of the second client 135, the stager computing device 132 can construct a customized virtual disk for such application that is back primarily by storage devices in the first plurality of storage servers 102-106 (e.g. HDDs). Finally, for the Zth application of the Zth client 136, the stager computing device 132 can construct a virtual disk that is partially backed by storage devices in the first plurality of storage servers 102-106 (e.g., for reads and writes of the "other" data) and is partially backed by storage devices in the second plurality of storage servers 114-118 (e.g., for reads and writes of the metadata).

It can, therefore, be ascertained that through use of server computing devices identified by relatively small number of storage server SKUs, a customized virtual disk for an arbitrary application that is to execute in the computing system 100 can be constructed. The virtual disk is exposed to the application at runtime as a linear address space, wherein portions of the linear address space are mapped to respective appropriate storage devices in the first plurality of storage servers 102-106 and/or the second plurality of storage servers 114-118. In other words, the arbitrary application has exposed thereto a virtual disk that is mapped to (striped across) the application-appropriate types of physical storage devices.

In an example, initially a client from amongst the plurality of clients 134-136 can set forth an application to the stager computing device 132. The application or client can specify an appropriate storage configuration that is to be used by such application, wherein the storage configuration can include an indication of type(s) and amount(s) of storage that is to be allocated to the application. The stager computing device 132 can identify available storage from the first plurality of storage servers 102-106 and/or the second plurality of storage servers 114-118 that match the storage configuration desired for the application, and can allocate such storage to the application. Additionally, the stager computing device 132 can identify at least one of the computing nodes 126-128 upon which the application is to execute.

The stager computing device 132 can provide the computing node that is to execute the application with addresses of the storage allocated to the application in storage devices of the first plurality of storage servers 102-106 and/or the second plurality of storage servers 114-118. The computing node may then load the application into memory and expose a virtual disk to the application, wherein the virtual disk is mapped to the addresses identified by the stager computing device 132. As the computing system network 130 is a full bisection bandwidth network, and as the storage servers have been allocated network bandwidth that at least matches the aggregate I/O speeds of the storage devices therein, the computing node executing the application can read data from and write data to the storage devices at full speed, thereby creating a locality-oblivious storage substrate for the application that is customized for such application, even though the computing system 100 comprises storage servers identified by a relatively small number of storage server SKUs.

Figure 2:
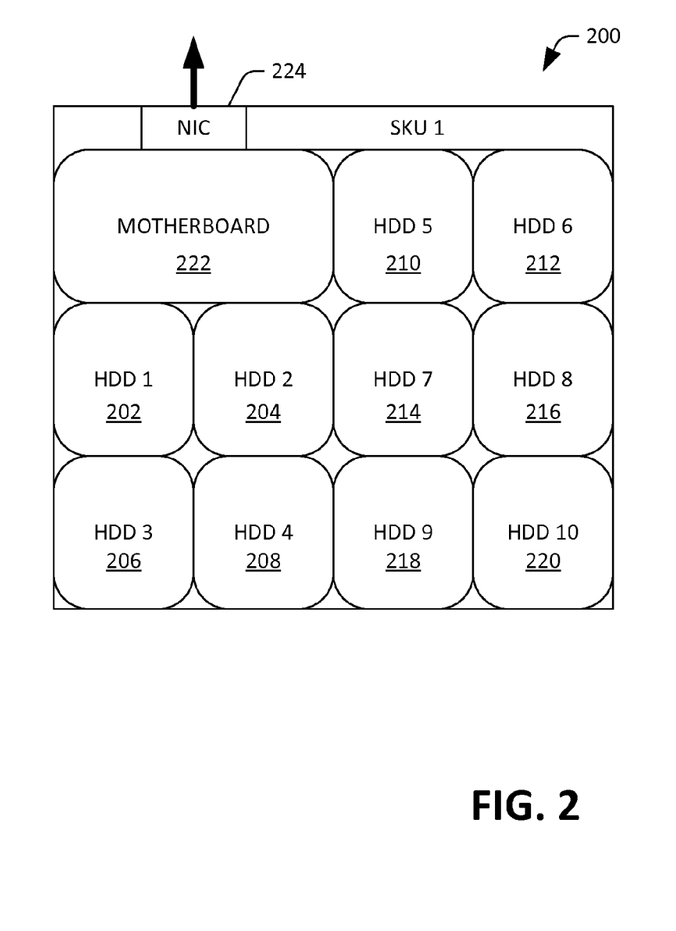
FIG. 2 is a block diagram of an exemplary storage server that can be identified by a first storage server stock-keeping unit (SKU).

Now referring to FIG. 2, an exemplary storage server 200 that is representative of storage servers identified by the first storage server SKU is illustrated. Accordingly, the storage server 200 may be included in the first plurality of storage servers 102-106. In the example shown in FIG. 2, the storage server 200 includes 10 HDDs 202-220, wherein such HDDs 202-220 may be homogeneous. Although the storage server 200 is shown as including 10 HDDs, it is to be understood that the storage server 200 may include more or fewer HDDs. The storage server 200 further includes a motherboard 222, which can comprise a native CPU chipset, and 10 ports for the respective 10 HDDs 202-220. In an exemplary embodiment, such ports may conform to the Small Computer System Interface (SCSI), Serial Attached SCSI (SAS), Serial Advanced Technology Attachment (SATA), or other suitable interface.

The storage server 200 may also include a local area network on motherboard (LOM) or NIC 224. In the example shown in FIG. 2, each HDD in the plurality of HDDs 202-220 may have a respective I/O speed associated therewith of 1 GB per second. Accordingly, the aggregate I/O speed of the storage server is 10 GB per second. The NIC 224 may provide a 10 GB per second connection to the motherboard 222. As the computing system network 130 is a full bisection bandwidth network, an arbitrary one or set of computing nodes from the plurality of computing nodes 126-128 can access each HDD in the plurality of HDDs 202-220 at full speed.

Figure 3:
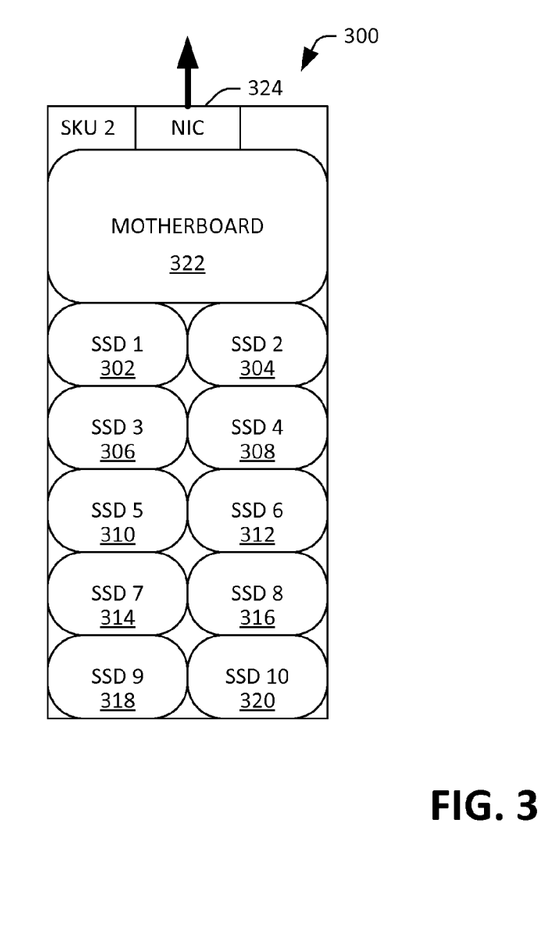
FIG. 3 is a block diagram of an exemplary storage server that is identified by a second storage server SKU.

Now referring to FIG. 3, an exemplary storage server 300 that is representative of storage servers that are identified by the second SKU is illustrated. Accordingly, the storage server 300 may be included in the second plurality of storage servers 114-118. The exemplary storage server 300 includes 10 SSDs 302-320, wherein the SSDs 302-320 may be homogeneous. Although the storage server 300 is shown as including 10 SSDs, it is to be understood that the storage server 300 may include more or fewer SSDs.

The storage server 300 further includes a motherboard 322. In an exemplary embodiment, the motherboard 322 may be the same as the motherboard 222 (to reduce cost of the motherboards 222 and 322). The storage server 300 also includes an LOM or NIC 324 that is configured to provide network bandwidth to the motherboard 322 that at least matches the aggregate I/O speed of the SSDs 302-320. For instance, if each SSD has a maximum I/O speed of 4 GB per second, the NIC 324 can provide a 40 GB per second network connection to the motherboard 322. The motherboard 322 includes a native CPU chipset, as well as 10 ports for respectively coupling the SSDs 302-320 to the computing system network 130. Although FIGS. 2 and 3 depict storage servers 200 that are representative of two storage server SKUs, it is again contemplated that other more than two storage server SKUs may be included in the storage system. For instance, a storage server identified by a third storage server SKU can comprise a plurality of random access memory (RAM) modules. Similarly, a storage sever identified by a fourth storage server SKU can comprise a plurality of phase change memory modules. In yet another example, a storage server identified by a fifth storage server SKU can comprise a plurality of tape drives. Thus, different sets of storage servers, each comprising a plurality of homogeneous storage servers, can be used to construct a customized virtual disk that is backed by customized types and amounts of storage.

Figure 4:
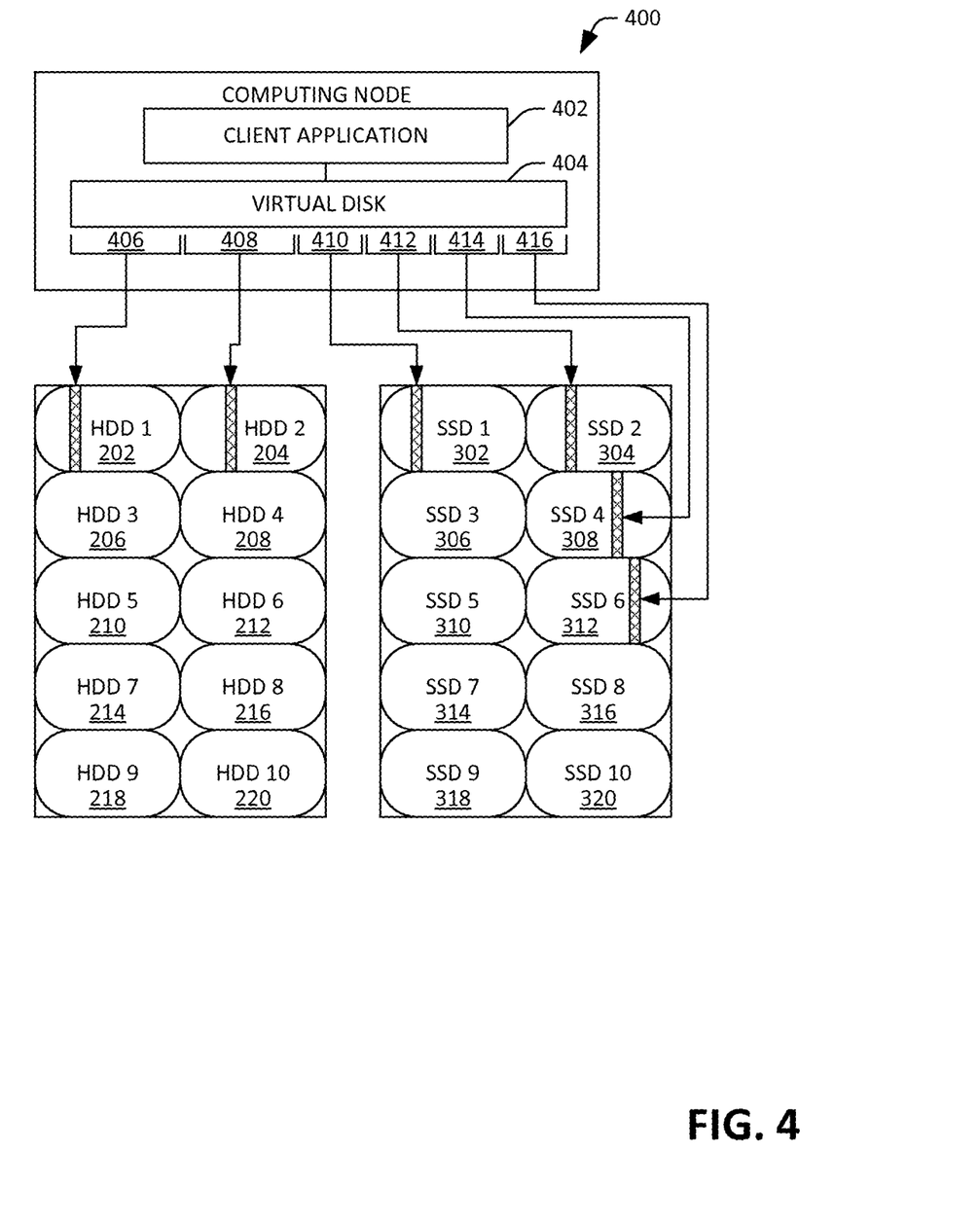
FIG. 4 illustrates an exemplary mapping between a virtual address space exposed to an application and storage devices in storage servers identified by different storage server SKUs.

Turning now to FIG. 4, an exemplary mapping of a virtual disk to physical storage devices in the computing system 100 is illustrated. The example depicted in FIG. 4 includes a computing node 400, wherein a client application 402 is loaded into memory of the computing node 400. Responsive to the client application 402 being loaded into the memory of the computing node 400, the computing node 400 exposes a virtual disk 404 to the client application. The virtual disk 404 is exposed to the client application 402 as a linear address space.

It can be ascertained that portions of the virtual disk 404 are mapped to portions of storage devices in the storage server 200 and the storage server 300, respectively. For purposes of illustration, the storage server 200 and the storage server 300 are displayed without the motherboards 222 and 322 and without the NICs 224 and 324. A first portion 406 of the virtual disk 404 is mapped to a portion of the first HDD 202 of the storage server 200. A second portion 408 of the virtual disk 404 is mapped to a portion of the second HDD 204. Accordingly, the first portion 406 and the second portion 408 of the virtual disk 404 can be striped across different HDDs in the storage server 200. In other exemplary embodiments, portions of the virtual disk 404 may be mapped to different HDDs in different storage servers that are identified by the first SKU.

A third portion 410 of the virtual disk 404 is mapped to a portion of the first SSD 302 in the storage server 300. A fourth portion 412 of the virtual disk 404 is mapped to a portion of the second SSD 304 of the storage server 300. A fifth portion 414 of the virtual disk 404 is mapped to a portion of the fourth SSD 308. A sixth portion 416 of the virtual disk 404 is mapped to a portion of the sixth SSD 312 of the storage server 300. Accordingly, the third portion 410, the fourth portion 412, the fifth portion 414, and the sixth portion 416 of the virtual disk 404 are striped across respective different SSDs in the storage server 300. In another exemplary embodiment, the portions 410-416 can be striped across SSDs in different storage servers identified by the second SKU. As indicated above, the storage substrate that backs the virtual disk 404 is a locality-oblivious storage substrate, such that locations of backing storage in the computing system 100 are respectively arbitrary. It can be ascertained that striping storage across different storage devices in different storage servers may reduce the possibility of catastrophic data loss since.

Figure 5:
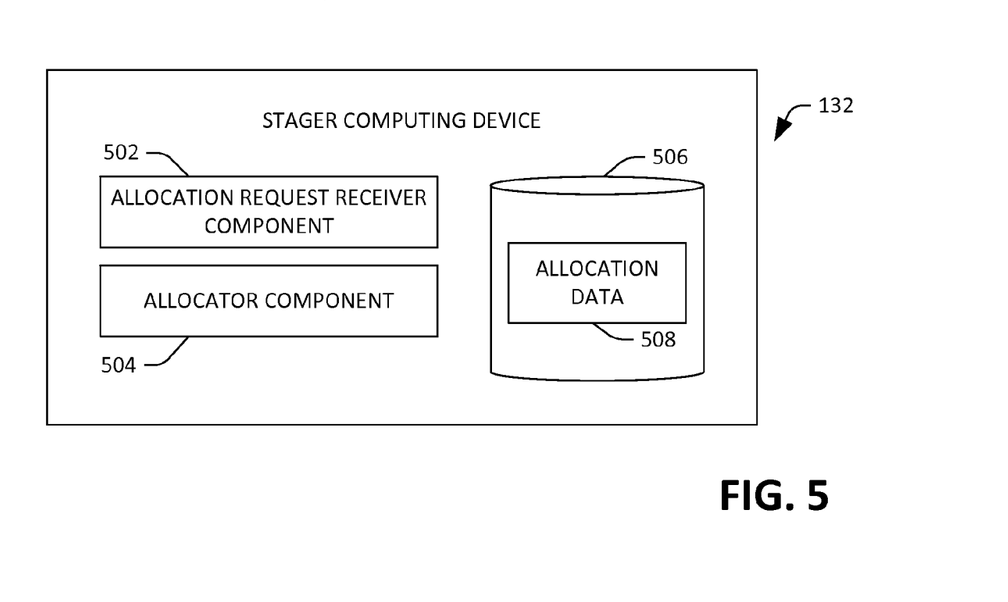
FIG. 5 is a functional block diagram of an exemplary stager computing device that can be included in a computing system.

With reference now to FIG. 5, a functional block diagram of the stager computing device 132 is illustrated. The stager computing device 132 includes an allocation request receiver component 502 that receives an indication of storage resources desirably included in a virtual disk for a particular application. For example, the application can indicate that data reads and writes for a particular address space (e.g., a first plurality of address spaces) are desirably performed on storage resources of a first type, while a second plurality of address spaces desirably correspond to reads and writes on a second type of storage resource (e.g., which may have different latency, I/O speed, etc., compared to the first storage resource).

The stager computing device 132 additionally includes an allocator component 504 that can allocate storage from amongst the first plurality of storage servers 102-106 and/or the second plurality of storage servers 114-118 based upon the request received by the allocation request receiver component. To accomplish such allocation, the stager computing device 132 can include or have access to a data store 506 that comprises allocation data 508. The allocation data 508 can identify available storage in the first plurality of storage servers 102-106 and available storage in the second plurality of storage servers 114-118 (e.g., storage that has not been allocated to other applications of other clients). The allocator component 504 may then allocate available storage resources to the application of the client that satisfies the request received by the allocation request receiver component 502. Thus, again, the stager computing device 132 can receive an arbitrary storage request for an application, and can allocate storage of the appropriate type in connection with generating a customized virtual disk for the application. As any of the storage devices in any of the storage servers 102-106 and 114-118 can be accessed at their full I/O speed by the computing nodes 126-128, the storage resources allocated by the allocator component 504 can be arbitrary.

Figure 6:
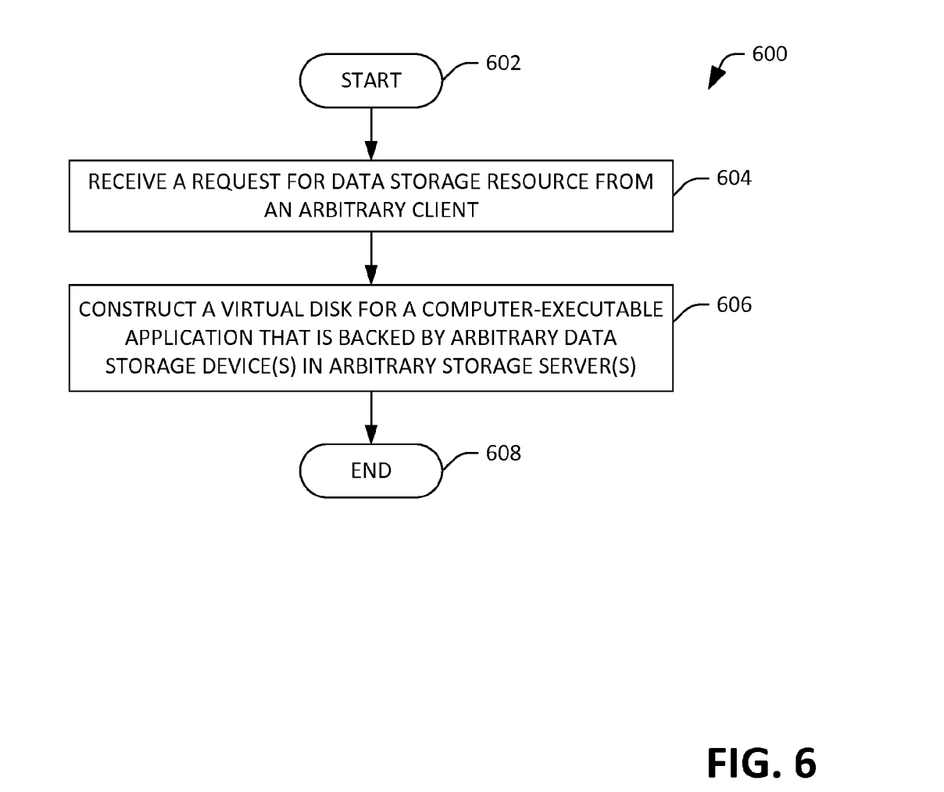
FIG. 6 is a flow diagram illustrating an exemplary methodology for constructing a virtual disk to expose to a computer-executable application of a client of a computing system.
Figure 7:
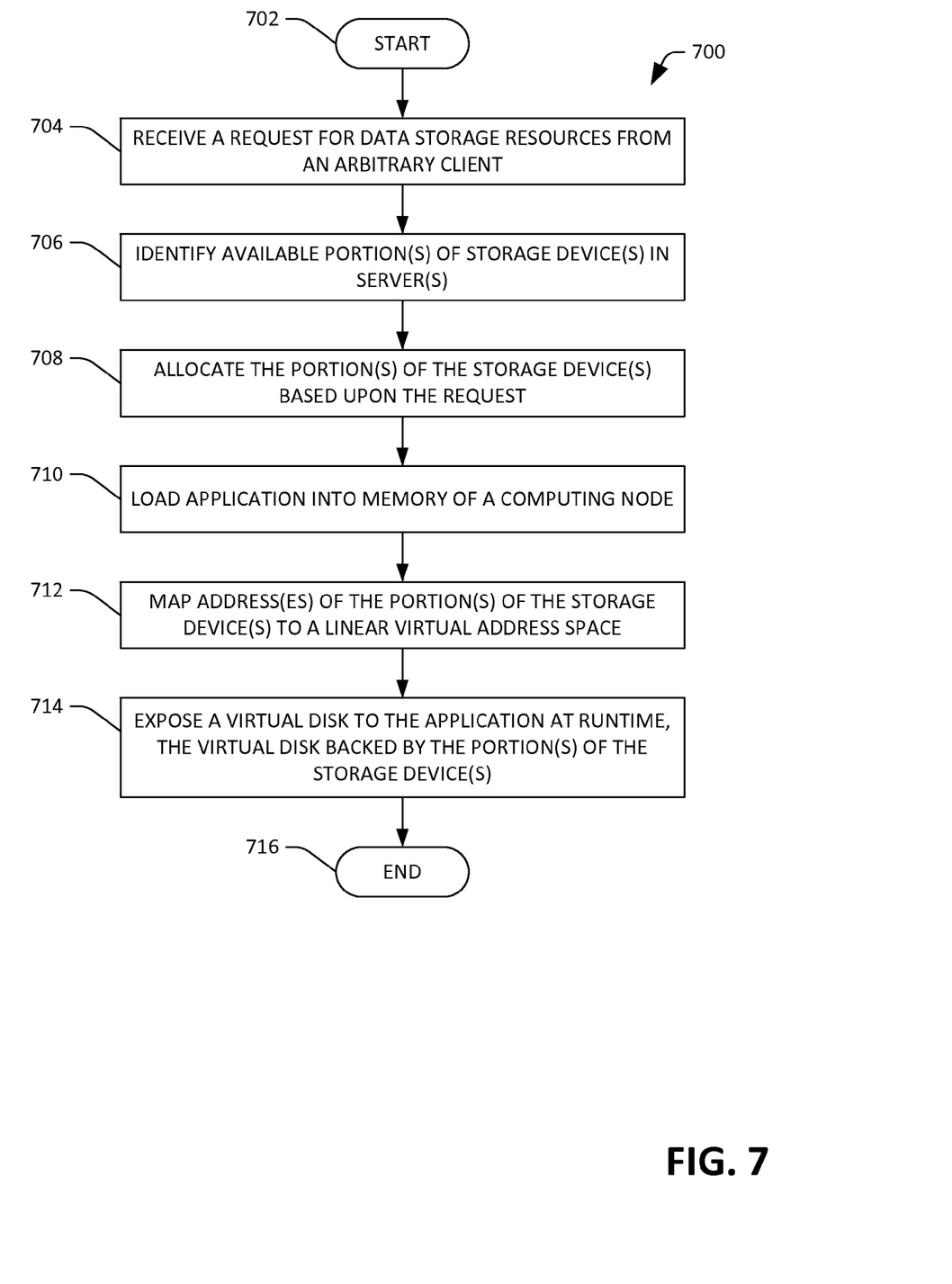
FIG. 7 is a flow diagram illustrating an exemplary methodology for exposing a virtual disk to an application executing at a computing system, wherein the virtual disk is backed by storage devices of storage servers identified by different storage server SKUs.

FIGS. 6-7 illustrate exemplary methodologies relating to constructing virtual disks. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or storage on a computer-readable medium or media. The computer-executable instructions can include a routine, a sub-routine, programs, a thread of execution, and/or the like. Still further, results of acts of the methodologies can be storage in a computer-readable medium, displayed on a display device, and/or the like.

Now referring to FIG. 6, an exemplary methodology 600 that facilitates constructing a virtual disk for a computer-executable application is illustrated. The methodology 600 starts at 602, and at 604 a request for data storage resources that are to be accessible to a computer executable application of an arbitrary client of a cloud operator that operates a computing system is received. The request can indicate types of storage resources that are to be accessible to the client and respective amounts of the types of the storage resources that are to be accessible to the client. For example, the request can indicate that the storage resources are to include a first type of storage resources, a second type of storage resources, and/or a first and second type of storage resources (as well as amounts of such resources).

At 606, responsive to receiving the request, a virtual disk for the computer-executable application is constructed. The virtual disk is backed by arbitrary data storage devices in arbitrary storage servers that are identifiable by a relatively small number of storage servers SKUs in the computing system. Specifically, constructing the virtual disk for the computer-executable application can include identifying available storage resources of the first type in an arbitrary first storage server identified by a first storage server SKU, wherein the first storage server is not customized specifically for the compute-executable application. Constructing the virtual disk can also include the act of identifying available storage resources of the second type in an arbitrary second storage server identified by a second storage server SKU. Similar to the above, the second storage server SKU can be non-customized for the computer-executable application.

After such storage resources have been identified, the available storage resources of the first type and the available storage resources of the second type can be allocated to the computer-executable application. The application can be loaded into memory of a computing node, and a virtual address space is exposed to the computer executable application. The virtual address space is a linear address space that is mapped to the storage resources of the first type and the storage resources of the second type that have been allocated to the computer-executable application. As noted above, the storage resources of the first type may be or include a HDD, while storage resources of the second type may be or include a SSD. The methodology 600 completes at 608.

With reference now to FIG. 7, an exemplary methodology 700 for exposing a virtual disk to a computer-executable application is illustrated. The methodology 700 starts at 702, and at 704 a stager computing device can receive a request for data storage resources from an arbitrary client, wherein the request is somewhat granular in nature. As noted above, the request can include specification of types of storage resources that are desirably accessed and amounts of the types of storage resources that are desirably accessible to the computer-executable application.

At 706, available portions of storage devices are identified in storage servers in a computing system. For example, a first portion of data storage available in storage devices in storage servers identified by a first storage server SKU can be identified, and a second portion of data storage available in storage devices in storage servers identified by a second SKU can be identified, wherein the first portion and the second portion satisfy the request received at 704.

At 708, the portions of the storage devices identified at 706 are allocated to the computer-executable application of the client. At 710, the application is loaded into memory of a computing node in the data center, and at 712, addresses of the portions of the storage devices identified at 706 are mapped to a virtual linear address space. At 714, at runtime of the computer-executable application, a virtual disk is exposed to the application, wherein the virtual disk has the virtual address space formed at 712. The methodology 700 completes at 716.

Figure 8:
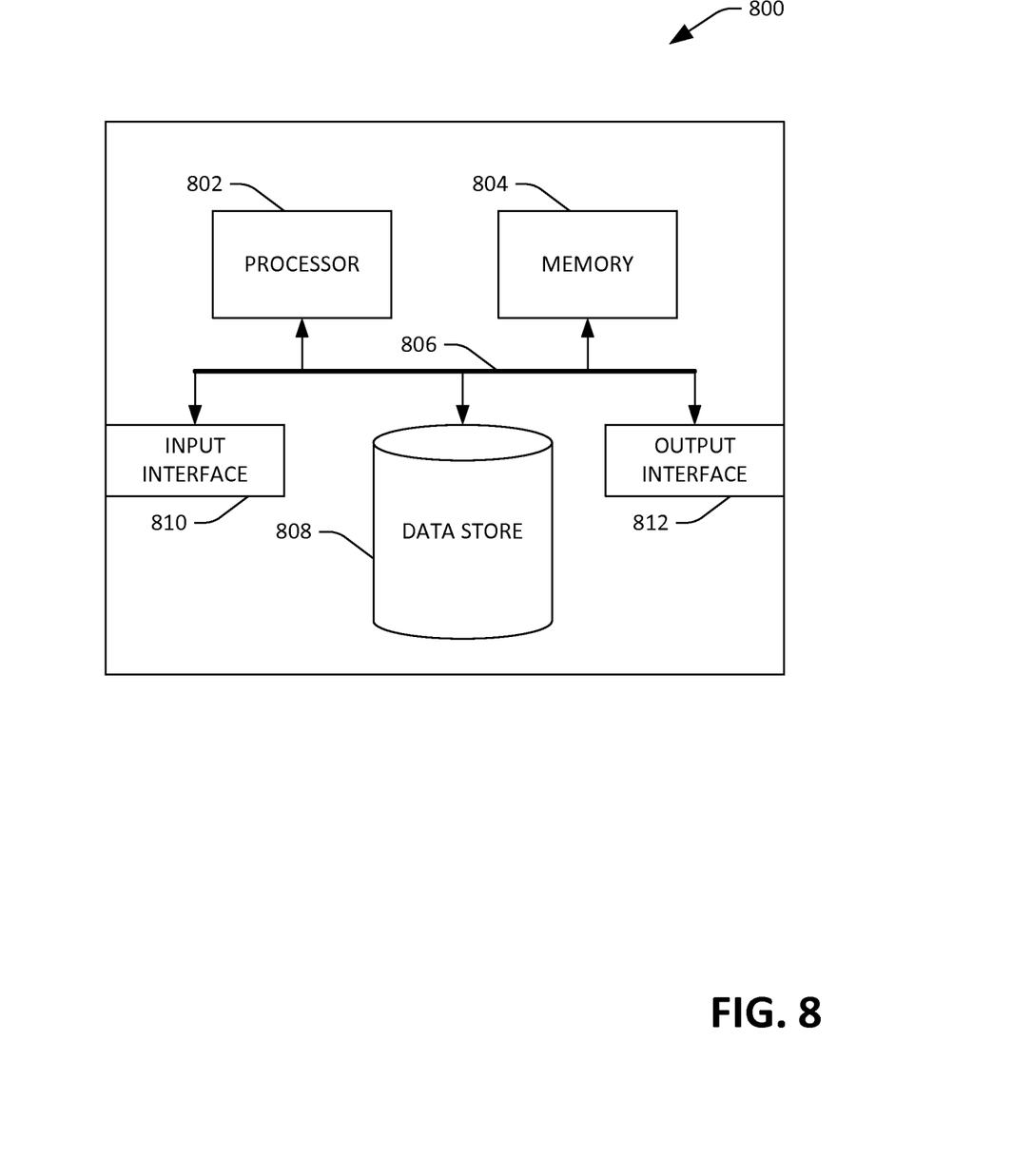
FIG. 8 is an exemplary computing device.

Referring now to FIG. 8, a high-level illustration of an exemplary computing device 800 that can be used in accordance with the systems and methodologies disclosed herein is illustrated. For instance, the computing device 800 may be the stager computing device 132. By way of another example, the computing device 800 can be a computing node in the plurality of computing nodes 126-128. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store the allocation data 508, images, etc.

The computing device 800 additionally includes a data store 808 that is accessible by the processor 802 by way of the system bus 2006. The data store 808 may include executable instructions, the allocation data 508, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be storage on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SoCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed at a stager computing device in a data center of a cloud operator, the method comprising:

receiving a request for data storage that is to be accessible to a computer-executable application that is to execute at the data center, the request indicating that the data storage is to include a first type of computer-readable storage and a second type of computer-readable storage that is different from the first type of computer-readable storage;

responsive to receiving the request, constructing a virtual disk that is customized for the computer-executable application, wherein constructing the virtual disk comprises:

identifying, in the data center, available first computer-readable storage of the first type in a first storage server identified by a first stock-keeping unit (SKU), the first storage server being non-customized for the computer-executable application;

identifying, in the data center, available second computer-readable storage of the second type in a second storage server identified by a second SKU, the second storage server being non-customized for the computer-executable application;

allocating the available first computer-readable storage and the available second computer-readable storage to the computer-executable application; and creating a virtual address space for the computer-executable application; and mapping the virtual address space to physical addresses of:

the first computer-readable storage of the first type that has been allocated to the computer-executable application; and the second computer-readable storage of the second type that has been allocated to the computer-executable application.

2. The method of claim 1, wherein the first computer-readable storage comprises portions of multiple hard disk drives (HDDs).

3. The method of claim 2, wherein the second computer-readable storage comprises portions of multiple solid state drives (SSDs).

4. The method of claim 1, further comprising:
loading the computer-executable application into memory of at least one computing node in the computing system; and
executing the computer-executable application, wherein the computer-executable application reads data from and writes data to the first computer-readable storage and the second computer-readable storage by way of the virtual address space.

5. The method of claim 4, wherein the computing node, the first storage server, and the second storage server are communicatively coupled by way of a computing system network, the computing system network being a full bisection bandwidth network.

6. The method of claim 5, wherein the first storage server comprises a plurality of HDDs, and the first storage server is allocated bandwidth of the computing system network that is at least an aggregate of input/output speeds of the plurality of HDDs.

7. The method of claim 5, wherein the second storage server comprises a plurality of SSDs, and the second storage server is allocated bandwidth of the computing system network that is at least an aggregate of input/output speeds of the plurality of SSDs.

8. The method of claim 1, wherein the acts of receiving and constructing are repeated for a plurality of computer-executable applications.

9. The method of claim 1, wherein the first type of storage is configured to have a first number of input/output operations per second, the second type of storage is configured to have a second number of input/output operations per second, the first number of input/output operations per second being greater than the second number of input/output operations per second.

10. A computing system, comprising:
a first plurality of homogeneous storage servers identified by a first stock-keeping unit (SKU), each storage server in the first plurality of storage servers comprising a respective plurality of data storage devices of a first type;
a second plurality of homogenous storage servers identified by a second SKU, each storage server in the second plurality of storage servers comprising a respective plurality of data storage devices of a second type that is different from the first type;
a plurality of computing nodes in communication with the first plurality of homogeneous storage servers and the second plurality of homogeneous storage servers; and
a stager computing device that is configured to receive a request for storage resources that is to be accessed by a computer-executable application when at least one computing node in the plurality of computing nodes executes the computer-executable application, the request for storage resources identifies the first type of data storage devices and the second type of data storage devices are to be accessed by the computer-executable application when the at least one computing node executes the computer-executable application, the stager computing device allocates, to the computer-executable application and based upon the request, first data storage in a first storage device in a first storage server from the first plurality of storage servers and second data storage in a second storage device in a second storage server from the second plurality of storage servers.

11. The computing system of claim 10, the computer-executable application loaded into memory of the at least one computing node, the at least one computing node accesses the first data storage and the second data storage at runtime of the computer-executable application.

12. The computing system of claim 11, wherein the at least one computing node, responsive to loading the computer-executable application into the memory, exposes a virtual address space to the computer-executable application, the virtual address space maps virtual addresses to physical addresses of the first data storage and physical addresses of the second data storage.

13. The computing system of claim 11, wherein the at least one computing node is communicatively coupled to the first plurality of storage servers and the second plurality of storage servers by way of a network, each storage server in the first plurality of storage servers and each storage server in the second plurality of storage servers is respectively allocated network bandwidth that is greater than or equal to an aggregate of input/output speeds of the plurality of data storage devices in a respective storage server.

14. The computing system of claim 13, the network being a full bisection bandwidth network.

15. The computing system of claim 11, the computer-executable application is executed in a distributed manner across the plurality of computing nodes.

16. The computing system of claim 15, each computing node comprising a respective system on chip (SoC) module, the SoC module comprising:
at least one microprocessor core;
a local memory that is accessed by the at least one microprocessor core; and
a network interface that interfaces the at least one microprocessor core to other devices on the network.

17. The computing system of claim 10, the plurality of data storage devices of the first type being hard disk drives (HDDs).

18. The computing system of claim 17, the plurality of data storage devices of the second type being solid state drives (SSDs).

19. A computing system, comprising:
a first plurality of homogeneous storage servers that correspond to a first stock-keeping unit (SKU), each storage server in the first plurality of storage servers comprising a respective plurality of hard disk drives (HDDs);
a second plurality of homogeneous storage servers that correspond to a second SKU, each storage server in the second plurality of storage servers comprising a respective plurality of solid state drives (SSDs);
a stager computing device that receives a request from a client of a cloud operator that operates the computing system, the request identifying data storage that is desirably allocated to a computer-executable application of the client, the data storage comprising a portion of storage on a HDD and a portion of storage on a SSD, the stager computing device, responsive to receiving the request, identifies:

first available storage in a HDD in a first storage server in an arbitrary one of the first plurality of storage servers; and second available storage in a SSD in a second storage server in an arbitrary one of the second plurality of storage servers;

the stager computing device configured to allocate the first available storage and the second available storage to the computer-executable application;

a computing node that is configured to load the computer-executable application into a memory of the computing node, the computing node exposing, to the computer-executable application, a virtual address space for storage that is backed by the first available storage and the second available storage; and a full bisection bandwidth network over which the computing node transmits data to and retrieves data from the first available storage and the second available storage when executing the computer-executable application.

20. The computing system of claim 10 being a data center that is configured to host a plurality of computer-executable applications.

* * * * *